UNITED STATES PATENT OFFICE.

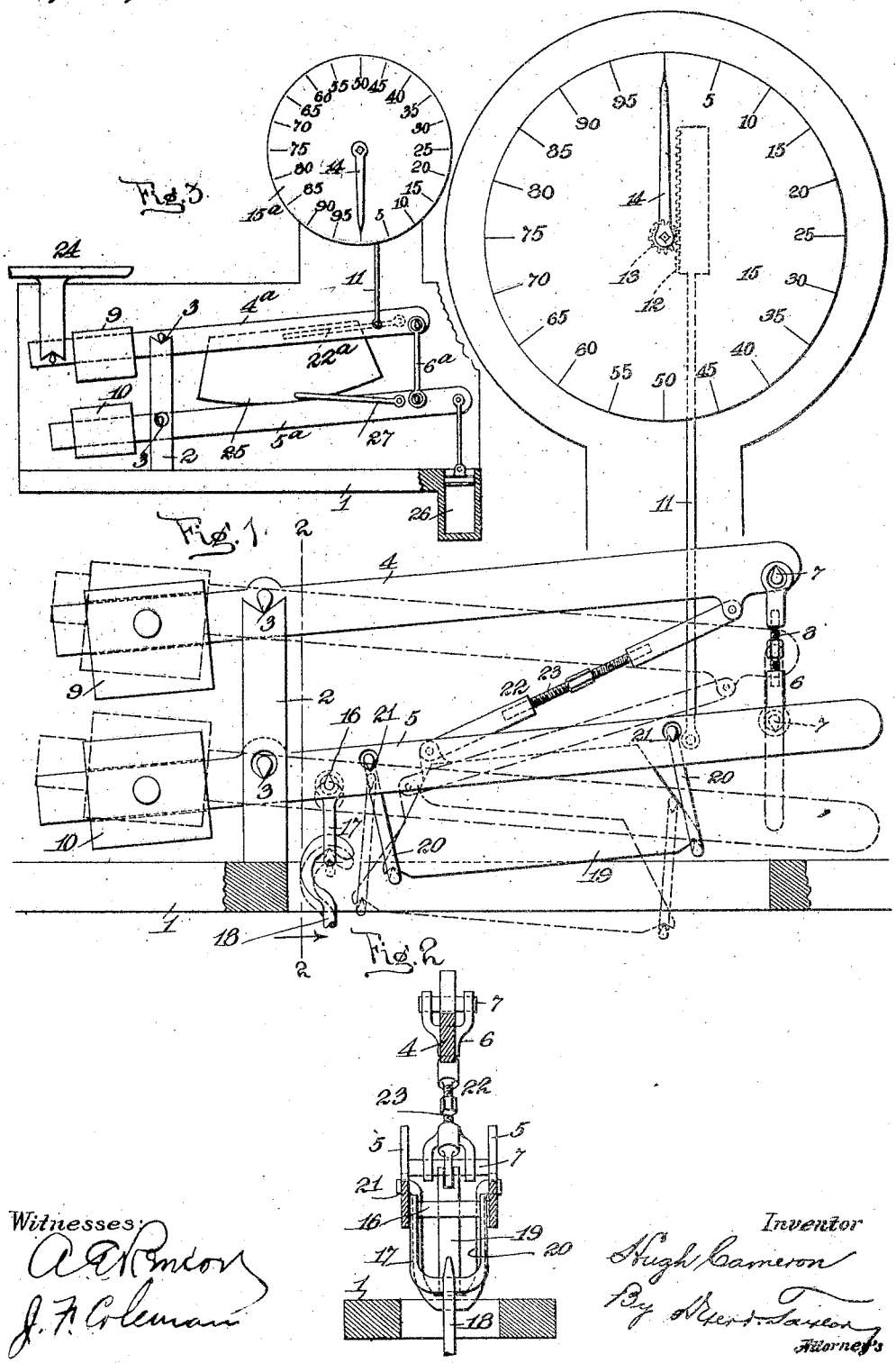

HUGH CAMERON, OF UNION COURSE, NEW YORK, ASSIGNOR TO DONALD CAMERON, OF BROOKLYN, NEW YORK.

SCALE.

1,316,271. Specification of Letters Patent. Patented Sept. 16, 1919.

Application filed November 2, 1917. Serial No. 199,642.

*To all whom it may concern:*

Be it known that I, HUGH CAMERON, a citizen of the United States, and a resident of Union Course, county of Queens, and State of New York, have invented a certain new and useful Improvement in Scales, of which the following is a specification.

My invention relates to automatic scales wherein the weight placed upon the platform or pan, as the case may be, will automatically bring the scale beam to a balance at some point within the travel of the scale levers and by means of which the travel of the levers and consequently the weight of the object will be registered on a dial in order that the reading of the weight may be seen at a glance, and wherein no manual manipulation of the compensating weight is required.

The object of my invention is to provide a simple, cheap and efficient device, wherein the weight may be read at one reading and at a glance thereby obviating calculation, thus saving time and insuring accuracy.

Another object is to provide a scale of the automatic type in which the necessity for accurate leveling of the scale is dispensed with without affecting the accuracy of the scale.

A further object is the production of a device wherein the liability of error is reduced to a minimum.

A still further object is to provide a device wherein springs, tapes and rapidly moving compensating weights are eliminated.

These and further objects will more fully appear in the following specification and the accompanying drawing considered together or separately.

All levers change in power as they travel above and below a horizontal line and in beam scales this change in power is neutralized by a compensating weight, which is moved to increase the power of the beam or lever as it moves or is moved upward and to decrease the power when it moves below the horizontal.

In the ordinary platform scale this compensation is accomplished by a weight which is moved manually along the beam until it is balanced and the position of the weight relatively to graduations on the beam will indicate the weight on the platform.

In automatic scales the compensating weight is usually in the form of weighted levers resembling somewhat the ball levers of steam engine governors. The weight levers are connected up to the beam by means of gear wheels, belts, springs and other complicated mechanism and as the weight levers themselves change in power as they travel toward or away from the horizontal they must themselves be compensated all of which tends to complicate such devices and to increase the liability to error.

By my invention the compensating weight is on the beam. The number of moving parts is reduced to a minimum. All moving parts are on anti-friction bearings and the travel of the beam and movement of the compensating weight are in perfect ratio.

I have illustrated one embodiment of my invention in the accompanying drawings in which like parts in all of the several figures are designated by similar characters of reference, and in which—

Figure 1 is a side elevation, partly in section, of one embodiment of my invention.

Fig. 2 is a transverse section on the line 2—2 of Fig. 1 and

Fig. 3 is a view similar to Fig. 1, but illustrating a modification.

In carrying out my invention I provide a base 1 which may, in the case of a platform scale, be carried on a standard or standards at a suitable distance above the platform (not shown). Extending upward from the base are two standards 2. In the standards on knife edge bearings 3 are pivoted two levers 4 and 5 which constitute the scale beam. In Fig. 1 these levers are of the third class while in Fig. 3 they are of the first class.

The long ends of the levers 4 and 5 are loosely connected together by means of a shackle 6 which engages the beams or lever on knife edges 7. The shackle is divided and its two parts are secured together by means which will permit the ends of the levers to be adjusted toward or away from each other. In the embodiment of the invention illustrated, the bearing portions of the shackle are secured together by a bolt 8 having right and left hand threads, whereby a turnbuckle is formed.

The levers or beams are extended at that side of the bearings opposite the shackle and lever 4 is provided with an adjustable weight 9 and lever 5 carries a similar weight 10. These weights are employed to balance the levers 4 and 5, so that they may normally lie in the desired position.

Pivoted to one of the levers 4 or 5 is a rod 11 which carries at its upper end a spur rack 12 adapted to engage a spur pinion 13, which in turn carries a hand or pointer 14, which coöperates with a suitably calibrated dial 15.

Pivoted to the lever 5 through the instrumentalities of a knife edge bearing 16 and a loose shackle 17 is a pitman 18 which, in the embodiment of the invention illustrated in Fig. 1, is connected to the well known scale leverage system on which the platform (not shown) is carried.

The lever 5, in the embodiment shown in Fig. 1, is composed of two members rigidly secured together in parallelism and suspended between the members is a weight 19 sufficiently heavy to compensate for the pull of the scale leverage system when a body is placed upon the platform. The weight 19 is suspended from the members of the lever 5 by means of U-shaped links 20. The links are pivoted to the lever by means of knife edges 21 and the ends of the compensating weight 19 engage and rest upon anti-friction bearings on the links. The weight is free to move longitudinally of the lever.

The weight 19 is connected to the lever 4 near the outer extremity thereof by means of a pivoted link bar 22. The link bar is divided and its two portions joined by means of a bolt 23 having oppositely disposed threads, whereby the length of the link bar may be adjusted and the position of the weight relatively to the fulcrum of the lever 5 varied.

In Fig. 3 I show a modification of my invention as applied to a counter scale. In this embodiment of the invention the levers 4ª and 5ª are arranged like the levers 4 and 5 of Fig. 1 except that the lever 4ª is formed of two parallel members and the lever 5ª is a single member. The lever 4ª carries a pan 24 on the opposite side of the fulcrum from the shackle 17 and the dial 15ª has the figures arranged in the reverse order from that of Fig. 1 and with the zero at the bottom instead of the top.

Instead of having the compensating weight suspended as in Figs. 1 and 2 the weight 25 rests upon the lever 5ª. The lower face of the weight 25 is in the form of a segment of a circle and has a rolling motion on the lever 5ª. The levers 4ª and 5ª are attached together by a shackle 6ª and the weight is attached to the lever 5ª by means of a link bar 22ª and the lever coöperates with a hand or pointer 14ª as in Fig. 1. The lower edge of the weight 25 has pivoted thereto a link 27 which is also pivoted to the beam member 5ª. This link will prevent the weight from sliding on the member 5ª when the distance between the pivot 3 of the member 5ª and the pivot of the shackle 6ª on the member 4ª varies, thereby compelling the weight to roll on the member 5ª and reduce friction.

I have shown the shackle 6ª and the link bar 22ª as non-adjustable but I desire to have it understood that these parts may be and preferably are adjustable, as for example, by means of the turn buckle arrangement shown in Fig. 1.

The lever 5ª at its long end coöperates with a damping device, such as a dash pot 26. It will be understood that the lever 5 in Fig. 1 is also preferably provided with a damping device to obviate excessive vibration.

The operation is as follows:—

In a scale such as is illustrated in Figs. 1 and 2 the shackle 6 is adjusted to bring the bearing edges of the knife edges 7, 7 the same distance apart as are the bearings 3, 3. The levers 4 and 5 constituting the beam are now in parallelism. The poises or weights 9 and 10 are adjusted so as to balance the beam and the scale lever system attached to the draft pivot 16 at the top of its travel and in the position shown in full lines in Fig. 1 with the pointer 14 indicating 0 on the dial. A body of known weight is now placed upon the platform. The test weight will pull on the beam and it will be lowered. As the beam travels downward the distance between the pivot 3 of the beam member 5 and the pivot 7 of the member 4 will be gradually decreased. The link bar will move the weight toward the fulcrum of the beam, and if the various parts of the device are properly coordinated the movement of the weight 19 along the beam will be in perfect ratio with the hand which will travel around the dial and come to rest at the character indicating the weight of the body. If the weight of the test body is not indicated by the pointer the operator will know that the movement of the compensating weight is too much or too little and the scale is fast or slow as the case may be. As the travel of the weight 19 is increased by lengthening the link bar 22 and reduced by shortening the bar it will now only be necessary to adjust the bar by means of the bolt 23 until the pointer indicates the weight of the test body. For a finer adjustment the free ends of the beam members may be adjusted relatively to each other and such movement will move the weight toward or away from the fulcrum of the beam as the ends are moved toward or away from each other. If, when the body is removed from the platform the hand does not stop at 0 the weight 9 may be moved to bring the hand to that point thus bringing the beam and the rack and pinion movement in perfect ratio. The device is now in condition for operation and will indicate the weight of any object, within its limits, placed upon the platform.

The draft pivot 16 may be placed at either side of the fulcrum and its position relatively to the fulcrum may be varied to suit scale lever systems of different multiplications.

I desire to have it understood that my invention is not limited to a scale beam composed of two members as shown but that any desired number of members other than one may be employed.

In accordance with the provisions of the patent statutes I have described the principle of my invention, together with the apparatus which I now consider to represent the best embodiment thereof, but I desire to have it understood that the apparatus shown is merely illustrative, and that the invention may be carried out in other ways.

Having thus described my invention what I now claim as new and desire to secure by Letters Patent, is:

1. A scale comprising a pivoted beam, a weight carried by the beam, pivotal connections between the beam and weight, and means for automatically moving the weight relatively to the fulcrum of the beam.

2. A scale comprising a pivoted beam, a weight carried by and bearing horizontally on the beam, pivotal connections between the beam and weight, and means for automatically moving the weight relatively to the fulcrum of the beam.

3. A scale comprising a pivoted beam, a weight carried by the beam, means for automatically moving the weight relatively to the fulcrum of the beam, and means for adjusting the last named means.

4. A scale comprising a pivoted beam, means for applying a load to the beam, a weight carried by the beam, and means operated by the movement of the beam for automatically moving the weight for balancing the beam.

5. A scale having a pivoted beam comprising two members, means for securing the members in parallelism, a compensating weight carried by one of the members, and a connection between the weight and the other member.

6. A scale having a pivoted beam comprising two members, adjustable means for securing the members in parallelism, a compensating weight carried by one of the members, and a connection between the weight and the other member.

7. A scale having a pivoted beam comprising two members, means for securing the members in parallelism, a compensating weight carried by one of the members, a connection between the weight and the other member for moving the weight longitudinally of the member.

8. A scale having a pivoted beam comprising two members, means for securing the members in parallelism, a compensating weight carried by one of the members, and an adjustable connection between the weight and the other member.

9. A scale having a pivoted beam comprising two members, an indicator, means for securing the members in parallelism, a compensating weight carried by one of the members, a connection between the weight and the other member, and connections between the beam and indicator.

10. A scale having a pivoted beam comprising two members, an indicator, means for securing the members in parallelism, a compensating weight carried by one of the members, a connection between the weight and the other member, and connections comprising a rack, pinion and pointer between the beam and indicator.

11. A scale having a dial, a pointer cooperating with the dial, a beam comprising two members independently pivoted, adjustable means for securing the members in parallelism, a compensating weight suspended from one member, a connection between the weight and the other member, means for adjusting the length of the connection, means for applying a load to the beam whereby the weight will be moved longitudinally of the beam to automatically balance the beam at points determined by the weight of the load, a rack carried by the beam, said rack engaging a pinion on the pointer.

12. A scale beam composed of a plurality of members arranged one above another, and so disposed that as the beam is tilted the distance between the free end of one member and the fulcrum of another member will be varied, a weight carried by and movable relatively to the lower member, and pivotal connections between the weight and the upper member.

13. A scale beam composed of a plurality of independently pivoted members arranged one above another, and so disposed that as the beam is tilted the distance between the free end of one member and the fulcrum of another member will be varied, a weight pivoted to the lower member, and pivotal connections between the weight and the upper member.

14. A scale beam composed of a plurality of members secured together at their ends and arranged one above another, and so disposed that as the beam is tilted the distance between the free end of one member and the fulcrum of another member will be varied, a weight pivoted to the lower member, and an adjustable pivotal connection between the weight and the upper member.

15. A scale beam composed of a plurality of independently pivoted members secured together at their ends and arranged one above another, and so disposed that as the beam is tilted the distance between the free end of one member and the fulcrum of another member will be varied, a weight suspended from and pivotally connected to the lower member, and an adjustable link pivoted to the weight and to the upper member whereby the center of gravity of the weight will be shifted longitudinally of the beam as the latter is tilted.

This specification signed and witnessed this 19th day of October, 1917.

HUGH CAMERON.

Witnesses:
 JAMES KLINE,
 HENRY MIDDLECHAUMP, Jr.